Oct. 16, 1951  R. S. BRANNIN  2,571,106
CROSS CONTROL SYSTEM
Filed Nov. 30, 1944  3 Sheets-Sheet 1

Fig. 1.

INVENTOR
RICHARD S. BRANNIN
BY
Herbert H. Thompson
ATTORNEY

Oct. 16, 1951  R. S. BRANNIN  2,571,106
CROSS CONTROL SYSTEM
Filed Nov. 30, 1944  3 Sheets-Sheet 2

INVENTOR
RICHARD S. BRANNIN
BY
his ATTORNEY

Patented Oct. 16, 1951

2,571,106

UNITED STATES PATENT OFFICE 2,571,106

CROSS CONTROL SYSTEM

Richard S. Brannin, East Williston, N. Y., assignor to The Sperry Corporation, a corporation of Delaware Application November 30, 1944, Serial No. 565,957

29 Claims. (Cl. 244—77)

My invention relates to a system for supplying and controlling the relative magnitudes of two or more signals to two or more signal responsive devices whereby said devices may be controlled by one or jointly by more than one of said signals, and the present invention has particular application to automatic pilots.

It will, of course, be understood that this invention is not limited to automatic pilots, but I have herein illustrated and described my invention as embodied in an automatic pilot mainly for exemplary purposes, and in the following will discuss the principles thereof in connection with aircraft and the movements thereof which bring about the desirability of providing the cross control system hereinafter described.

The conventional aircraft is provided with a rudder for controlling movements of the craft in azimuth about its yaw axis, elevators for controlling movement of the craft about its athwartships or pitch axis and ailerons for controlling the craft about its fore and aft or bank axis. Conventional automatic pilots are designed to detect deviations of the craft from a predetermined stabilized position about all three of these axes and to supply signals which effect an actuation of the control surfaces of the craft to restore it to the position from which it deviated. Any deviation in azimuth is corrected by movements of the rudder, deviations in pitch by the elevators, and corrections in bank are effected by the ailerons. When the aircraft is in level flight, the rudder and elevators alone are properly adjusted to correct for deviations in yaw and pitch of the craft, respectively. However, when the aircraft executes a turn and the craft is banked, the rudder serves a dual function. That is, it operates both as a rudder and as an elevator, depending upon the bank angle of the craft. Similarly, the elevator acts to some extent both as an elevator and a rudder. For example, at a bank angle of 90°, the elevators would function solely as a rudder while the rudder would function solely as an elevator. For bank angles of less than 90°, the division of the functions of these control surfaces as elevators and rudder varies as a sine and cosine function of the angle of bank of the craft.

From the foregoing it can be seen that, in order properly to stabilize an aircraft while executing a turn, the signal normally applied in controlling the rudder should, to some extent, be applied to control the elevator, the amount of the signal so transferred being dependent upon the bank angle.

It is therefore a primary object of the invention to provide a cross control system for aircraft which functions, in effect, to cross the rudder and elevator controls such that, in a banked condition of the craft, both rudder and elevator will be correctly actuated for controlling the craft about azimuth and pitch, space axes, that is, axes in space which are vertical and horizontal and constitute those axes about which the craft turns in azimuth and pitch movements.

It will be observed that with conventional types of automatic pilots wherein the rudder and elevators control the craft about the yaw and pitch axes, respectively, that when the craft is banked any correction for deviation of the craft about either of these axes will be applied not in the correct direction to zero the error, but an angle equal to the bank angle from the correct direction. Of course, when the bank angle is small, these errors in correction may be neglected, but when the bank angle is relatively large the effective change in sensitivity and in time lag of the automatic pilots will adversely affect the stability of the system.

Broadly speaking, it is an object of the present invention to provide a control system for a body, which is movable about two axes in space, comprising a pair of means which respectively control movements of the body about two of its axes which correspond to said space axes, means for normally controlling one of said pair of means, and means for progressively transferring said control to the other of said pair of means in accordance with movements of the axes of said body out of correspondence with one and toward the other of said space axes.

It will be observed that the present invention is also particularly adapted for use with remotely controlled or radio-controlled projectiles which may rotate about their longitudinal axes during flight in an uncontrolled manner whereby one control surface thereof will function to control movement of the projectile about more than one space axis. For example, assuming the projectile to rotate continuously about its longitudinal axis during flight, one of its vanes or control surfaces will first control the projectile solely in movements about one space axis, then it will serve simultaneously to control it about said one space axis and a second and then solely about said second space axis. Thereafter, the cycle will repeat. Likewise, the present invention is adapted for use in remote or radio-controlled bombs and in rockets and the like.

More particularly, it is an object of my invention to provide a control system for dirigible craft, which craft is provided with a control surface for controlling movements of the craft about an axis thereof, signal responsive means for actuating the control surface, a pair of signal producing means responsive respectively to movements of said craft about said axis and a second axis of the craft, and means for supplying signals from said pair of means to said actuating means in amounts dependent upon movements of the craft about an axis normal to said two axes.

Another object resides in providing a control system of the foregoing character wherein the craft is provided with two control surfaces for controlling movements of the craft about a pair of axes, said system comprising a pair of signal responsive means for actuating said control surfaces, respectively, and means for supplying the signals from each of said signal producing means to both of said signal responsive means in amounts dependent upon the displacement of the craft about a third axis.

Another object resides in providing an automatic pilot in which each of the rudder and elevator signals are supplied to both the rudder and elevator control means and are controlled in accordance with the tilt of the craft in bank.

Another object resides in providing control systems of the foregoing character in which the signals so transferred from one signal-responsive means to another are varied as a sine and cosine function of the movement of the craft about its bank axis.

Still another object resides in providing signal control systems of the foregoing characters in which the means for transferring the signals from one signal-responsive device to another is controlled by a gyro vertical.

With the foregoing and still other objects in view, my invention includes the novel elements and the combinations and arrangements thereof described below and illustrated in the accompanying drawings, in which—

Figure 1:
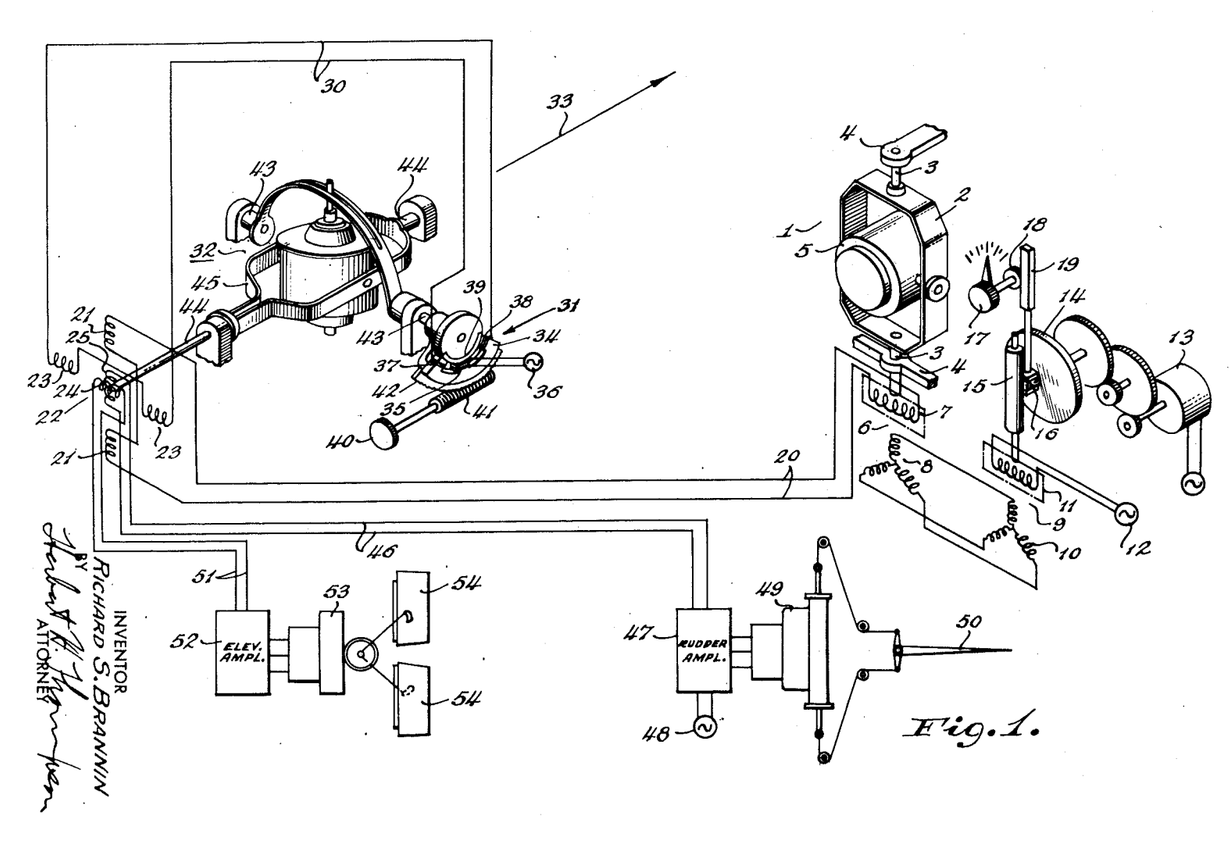
Fig. 1 is a fragmentary, schematic representation in perspective of an automatic pilot embodying the present invention.

Referring first to Fig. 1 wherein I have illustrated an automatic pilot embodying one form of the present invention, I indicates generally a directional gyro which may be of any conventional form for providing a directional reference in azimuth or, in connection with the correlated parts of the automatic pilot, to stabilize an aircraft about its yaw axis. The directional gyro comprises the usual vertical ring 2 suitably mounted to pivot, by means of trunnions 3 and bearings 4, about its azimuth axis. The rotor of the gyro, of course, is contained in the rotor bearing case 5 which is rotatably supported in the vertical ring 2. A pick-off is associated with the trunnions 3 whereby to provide a signal output when the craft on which the gyro I is mounted deviates from some predetermined course or heading; or, the cooperable parts of the pick-off may be relatively adjusted to provide a signal for course changing purposes. In the embodiment herein illustrated, I have shown an electrical pick-off indicated generally at 6 which is of the "Selsyn" or "Autosyn" type and comprises a rotor 7 which is fixed to rotate with the vertical ring 2 of the directional gyro and a stator 8 which is fixed to the craft. Actually, the rotor 7 is maintained fixed in azimuth by the gyro while the stator 8 rotates with the craft in azimuth. Ordinarily, the output from the pick-off or signal-producing means 6 would be supplied to an amplifier which controls a servo motor for positioning the rudder of the craft. However, in accordance with the present invention, the output of the pick-off 6 is supplied to a signal mixer or transformer, hereinafter described.

In Fig. 1, I have shown the pick-off 6 connected in cascade with a second signal-producing means 9 which supplies a rate of turn control signal. The polycircuit stator 8 of the first signal-producing means 6 is connected in polycircuit with the stator 10 of the second signal-producing means 9, the rotor 11 of which is energized from a suitable source of alternating current 12 and is adapted to be rotated from a constant speed motor through a variable speed transmission. The constant speed motor 13 drives, through suitable gearing, the disc 14 of the variable speed transmission, the cylinder 15 thereof being connected to drive the rotor 11 of the signal-producing means 9 and the ball carriage 16, which engages disc 14 and cylinder 15, being movable in translation by the rate of turn control knob 17 through the gear 18 and rack 19.

With the combination of elements above described for controlling movements of the craft in azimuth, it will be seen that if the rotors 7 and 11 of the signal-producing means, which may be termed a receiver and transmitter, respectively, lie in the same position relative to the fields of the stators, zero signal voltage output will be derived from the receiver 6. Assuming that the rotor 11 remains stationary relative to the stator 10, a signal voltage output from receiver 6 will appear only when the rotor 7 and stator 8 thereof are relatively moved, which may be due to deviation of the craft from a predetermined heading. However, when the rate of turn knob 17 is actuated to move the ball carriage 16 from its position wherein no motion is transmitted to the cylinder 15, the rotor 11 and transmitter 9 will rotate at a rate depending upon the setting of the knob 17 whereupon a signal output will be derived from the receiver 6. As above explained, this signal normally effects an operation of the rudder servo to cause the craft to turn about its azimuth axis and a displacement of the rudder from its neutral position will be effected by such signal output until the actual rate of turn of the craft coincides with the rate of turn set in by the rate control knob 17. Under these conditions, the rotors of the two signal-producing means will rotate in substantial synchronism and therefore provide substantially zero signal output.

In accordance with the present invention, the voltage output of the pick-off or receiver 6 is supplied through conductors 20 to one of the field windings 21 of a signal transformer indicated generally at 22 in Fig. 1. This signal transformer, hereinafter more particularly described, comprises two field windings having their magnetic axes arranged normal to each other, the second field winding comprising the coils 23. The rotor of this transformer also comprises a pair of windings having their magnetic axes arranged at right angles to each other, the respective windings being indicated at 24 and 25. The function of transformer 22 is to supply, under certain conditions, the signal voltage output from the directional gyro pick-off 6 both to the rudder amplifier and the elevator amplifier, which respectively control the operation of the rudder and elevators of the craft. Furthermore, the amount of the signal derived from the direction gyro pick-off, which may be called the rudder signal, which is supplied to the rudder amplifier by the transformer 22 varies as a cosine function of the angle of bank of the craft, while the amount of rudder signal supplied to the elevator amplifier varies as a sine function of the angle of bank. The transformer may, of course, vary the signal as any desired function and such will depend upon the distribution of the transformer winding. As hereinafter pointed out, the transformer 22 also serves to supply, under certain conditions, an elevator signal both to the elevator amplifier and to the rudder amplifier in amounts varying as a sine and cosine function of the bank angle.

Figure 2:
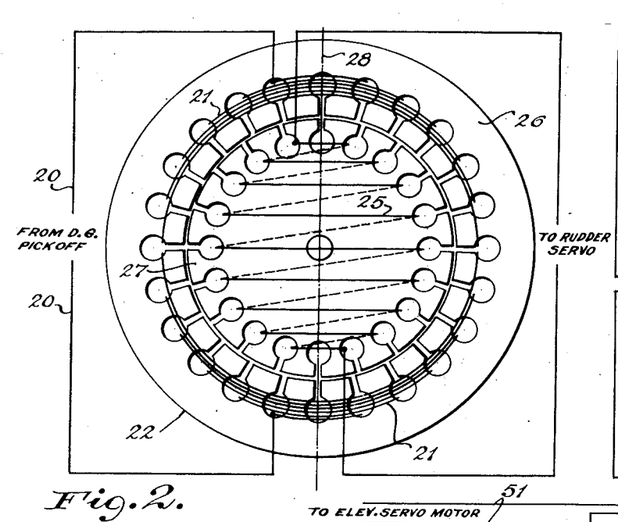
Fig. 2 is a somewhat schematic representation of an induction type signal transformer or mixer employed in the present invention.
Figure 3:
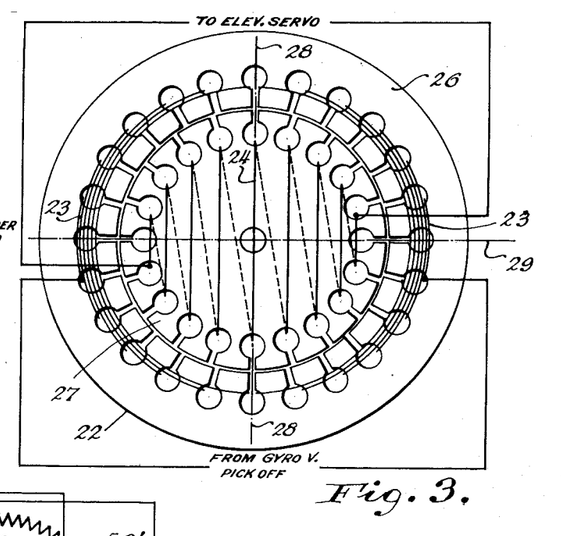
Fig. 3 is a view similar to Fig. 2, but illustrating a second rotor and stator winding which are not illustrated in Fig. 2.

The transformer 22 is more clearly but schematically shown in Figs. 2 and 3 and comprises a stator 26 and a rotor 27. To clarify the illustration of this transformer, I have illustrated the rotor and stator parts as occupying identical relative positions in Figs. 2 and 3 and shown but one of the two stator and rotor windings in each figure. For instance, in Fig. 2, I have shown the coils 21 of the stator having their magnetic axes represented by the dot-dash line 28. Similarly, I have shown the rotor winding 25, the magnetic axis of which in Fig. 2 coincides with the axis 28. The windings 21 of the stator and winding 25 of the rotor are so arranged and distributed in the slots therefor as to provide induced voltages in the rotor winding 25 which vary as a sine or cosine function of the angle through which the stator and rotor are relatively turned.

In view of the foregoing, it is seen from an inspection of Fig. 2 that when the stator and rotor occupy the relative positions therein illustrated, maximum voltage from the directional gyro pick-off will be induced in the rotor winding 25. However, as the stator and rotor are relatively turned, the signal voltage induced in the rotor winding will decrease and varying as a cosine function of the angle through which such relative movement takes place. When the rotor is moved 90° from the position shown in Fig. 2 and relative to the stator, zero voltage will be induced in the winding 25.

The stator 26 and rotor 27 also carry a second winding. These windings are shown in Fig. 3 and are generally similar to the windings hereinabove described, but their magnetic axes are displaced 90° relative thereto. The stator winding 23 is arranged in a manner similar to winding 21, that is, to provide a sine or cosine variation in the voltages induced in the rotor winding 24, but its magnetic axis represented by dot-dash line 29 is fixed at right angles to the axis 28 of winding 21. The second winding 24 of the rotor lies with its magnetic axis disposed at right angles to the axis of winding 25.

In the foregoing, I have indicated that the signal voltages from the pick-off at the directional gyro are supplied to the winding 21 of the transformer 22 and it is to be understood that the winding 25 of the rotor is connected with a rudder amplifier as will hereinafter be explained. The winding 23 of the stator is adapted to be connected to receive voltages from a pick-off or signal-producing means which is designed to control the elevator servo and it is further to be understood that the second winding 24 of the rotor is connected to an elevator amplifier. For the relative positions of the stator and rotor illustrated in Figs. 2 and 3, all of the rudder signal voltage from the directional gyro pick-off will be supplied through winding 25 to the rudder amplifier and zero rudder signal will be induced in the winding 24 and therefore no rudder signal will be supplied to the elevator amplifier. Likewise, all of the signal voltage derived from the pick-off primarily intended to control the elevators will be induced in the winding 24 and supplied to the elevator amplifier while no part thereof will be induced in winding 25 connected to the rudder amplifier. Under these conditions or for level flight of the aircraft, all of the rudder signals are supplied to the rudder amplifier while all of the elevator signals are supplied to the elevator amplifier. However, when relative movement between the rotor and stator of the transformer is effected, some of the rudder signals or the voltages impressed across winding 21 will be induced in winding 25 and also in winding 24 and the amounts thereof will vary as a sine or cosine function of the angle through which the transformer parts have been relatively angularly displaced. Similarly, some of the elevator signals will be supplied both to the elevator amplifier and rudder amplifier and the amounts thereof will also vary in a sine and cosine manner.

Referring again to Fig. 1, the winding 23 of transformer 22 is connected through suitable conductors 30 to a source of elevator signal such as the E-transformer type of pick-off indicated generally at 31. Pick-off 31 is associated with one of the axes of the gyro vertical, indicated generally at 32, which lies athwartships of the craft or the pitch axis of the gyro. The fore and aft axis of the craft is represented by the arrow 33 which also constitutes the bank axis of the craft and the gyro vertical. Any type of pick-off may be employed, but for illustrative purposes I have shown an E-transformer type which comprises an E-shaped core 34 about the middle leg of which is mounted an exciting coil 35 connected with a suitable source of alternating current 36. The outer legs of the core are surrounded by pick-up windings 37 and 38 which are connected to combine the signal voltages induced therein in bucking relation across the conductors 30. Core 34 is mounted in relatively fixed relation on the craft while a cooperating armature 39 is secured to the trunnion 43 of the gyro vertical, the axis of which coincides with the pitch axis of the craft. Normally, when the craft deviates in pitch, the armature and the core of transformer 31 will move relative to each other, producing a voltage output having a magnitude and phase sense dependent upon the magnitude and direction of rotation of the pick-off parts. A signal for change in pitch of the craft may be provided manually by means of the knob 40 through worm 41 and worm gear 42 which is affixed to the core of the pick-off.

The gyro vertical as illustrated in Fig. 1 is free to move about the axes defined by trunnions 43 and trunnions 44. The axis of trunnions 43 is coincident with the axis of the trunnions which rotatably support the rotor bearing case of the gyro in the gimbal ring 45 and, as hereinbefore indicated, the axes of these trunnions lie athwartships of the craft. The axis of the gimbal ring 45 or trunnions 44 coincides with the fore and aft or bank axis of the craft.

In accordance with the preferred embodiment of my invention, the rotor of the signal transformer or mixer 22 is connected with one of the trunnions 44 of the gyro vertical so that when the attitude of the craft in bank changes, a corresponding change of the relative positions of the rotor and stator of the transformer will take place. In this respect, therefore, since the trunnions 44 of the gyro vertical parallel the fore and aft axis 33 of the craft, the gyro vertical provides a directional reference normal to the fore and aft axis of the craft or a base reference from which bank angle or roll of the craft may be measured. Hence, the amounts of rudder and elevator signals which are supplied to the elevator and rudder amplifiers will vary as a sine or cosine function of the angle of bank of the craft. The winding 25 of the rotor of transformer 22 is connected through conductors 46 to a rudder amplifier 47 which is preferably of any well known phase-sensitive type, the amplifier being connected with a source of reference voltage 48. The voltage sources hereinbefore represented at 12 and 36 and source 48 may constitute a common source. The output of the amplifier 47 is connected to control the rudder servomotor 49 which in turn actuates the rudder 50 of the aircraft. Similarly, the winding 24 of the rotor of transformer 22 is connected through conductors 51 to an elevator amplifier 52, the output of which controls the elevator servomotor 53 which, in turn, serves to actuate the elevators 54 of the aircraft.

Briefly, it should be understood from the foregoing that the preferred embodiment of my invention, above described, operates as follows. Under normal level flight conditions, wherein the stator and rotor of the windings of transformer 22 occupy the relative positions illustrated in Figs. 1, 2 and 3, a rudder signal derived from the directional gyro 1 will be supplied, in toto, to the rudder amplifier 47 while zero rudder signal will be supplied to the elevator amplifier. Likewise, the elevator signal will be supplied only to the elevator amplifier. Hence, under level flight conditions, any deviation of the craft in azimuth will effect only an operation of the rudder. However, when the craft is banked and the rudder and elevators serve dual functions in controlling the attitude of the craft about azimuth and pitch space axes or horizontal and vertical axes in space, part of each of the rudder and elevator signals will be supplied to both rudder and elevator amplifiers, the amounts thereof being dependent upon the bank angle of the craft and varying as a sine or cosine function thereof as above explained.

Figure 4:
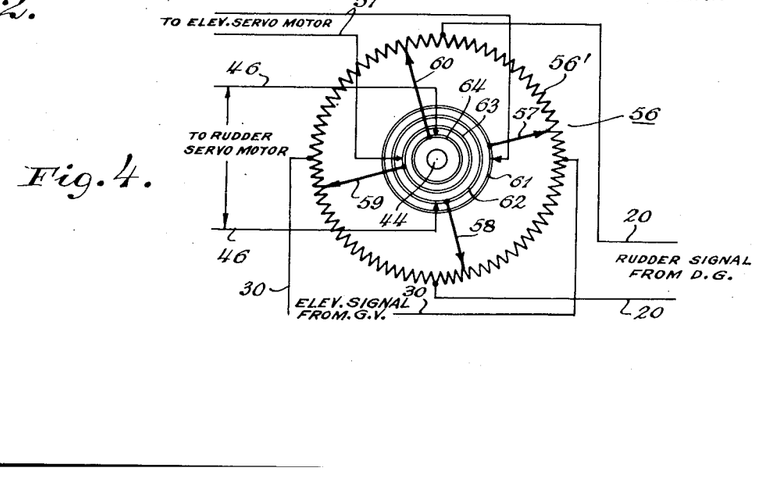
Fig. 4 schematically represents a potentiometer type signal controller or mixer.

In the above, I have described a signal transformer of the induction type. In Fig. 4 I have illustrated a potentiometer-type signal control device or mixer which functions substantially in the same manner as transformer 22. The device of Fig. 4, indicated generally at 56, comprises an annular resistance element 56' which is preferably of a continuous or uninterrupted character. Two diametrically opposite points thereof are connected to conductors 20 which serve to impress the rudder signal across the halves of resistor 56'. Conductors 30, connecting with the elevator signal pick-off, are also connected to diametrically opposite points of the resistor 56', but in 90° spaced relation to the points to which the conductors 20 are connected. Resistor 56' may be fixed to the craft in a manner similar to the stator of transformer 22 while the rotor of potentiometer 56 may be connected with and positioned by the trunnion 44 of gyro vertical 32. The rotor of potentiometer 56 comprises four contact arms 57, 58, 59 and 60 arranged to slide over resistor 56' in relatively fixed angular relationship at points spaced 90° apart. These arms may be connected respectively to slip rings 61, 62, 63 and 64, the arms and slip rings being suitably mounted on or positioned by the trunnions 44 of the gyro vertical. Conductors 46 which connect with the rudder servomotor are connected through suitable contacts with the slip rings 62 and 64 and conductors 51 which connect with the elevator servo amplifier are connected through contacts with the slip rings 61 and 63.

It will be observed that relative movement between the resistance element and the contact arms of the potentiometer above described may be effected in the same manner as movement between the rotor and stator of the transformer 22. Furthermore, the function of the potentiometer will be substantially the same as that of transformer 22, that is, it will serve to supply rudder or elevator signals both to the rudder and elevator amplifiers in amounts dependent upon the bank angle of the craft. For example, under level flight conditions, arms 57 and 59 will engage the resistor 56 at those points thereof to which conductors 30 are connected, while arms 58 and 60 will engage those points of the resistors to which conductors 20 are connected and under these conditions, all of the rudder signal will be supplied to the rudder amplifier and all of the elevator signal to the elevator amplifier. Movements of the contact arms relative to the resistor from these positions will reduce the amount of one signal voltage supplied to one of said amplifiers while increasing the amount thereof supplied to the other. In accordance with the preferred form of this invention the magnitudes of the signal voltages will vary as sine and cosine functions of the bank angle. However, as hereinbefore explained, the signal voltages may vary linearly, the particular function depending upon the arrangement of the resistor windings.

In the foregoing, I have described the preferred embodiment of my invention wherein the interchange of signals is controlled directly in accordance with the bank angle of the craft. However, other means may be provided to operate the signal mixer such, for example, as illustrated in the embodiments of my invention appearing in Figs. 5 and 6.

Figures 5, 6:
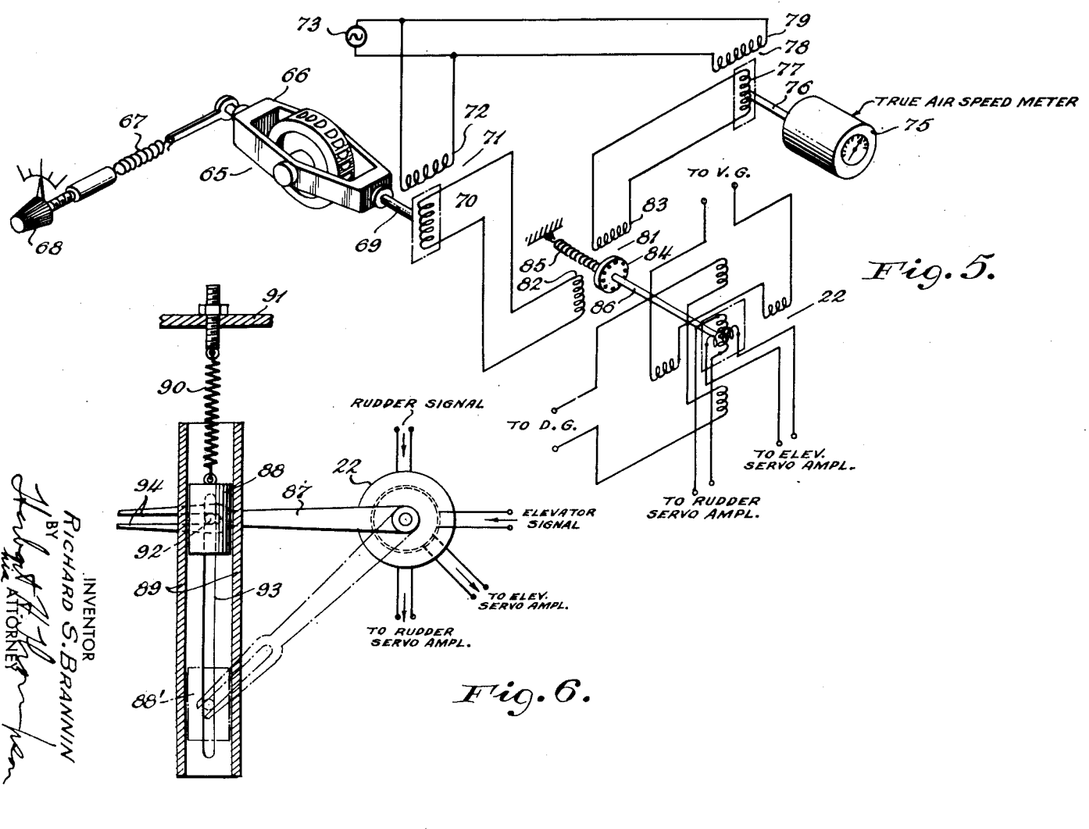
Fig. 5 schematically represents in perspective a modified form of the present invention.
Fig. 6 schematically represents a still further modified form of this invention.

For example, the bank angle of an aircraft may be determined from the equation:

$$\tan x = \frac{WV}{g}$$

where $x$ is the bank angle, $W$ is the angular velocity of the craft, $V$ is air speed, and $g$ is the acceleration due to gravity or a constant. In accordance with the embodiment of my invention shown in Fig. 5, I provide means for computing the foregoing equation, determining the value of the bank angle and effecting relative rotation of the parts of the signal control transformer or potentiometer in accordance with the value so determined. For example, W, the angular velocity, may be measured by a rate of turn gyroscope and the air speed may be determined by any well known air speed measuring device or meter. These two quantities constitute the variables of the equation and the circuit may be arranged to introduce any constant and the desired tangent function.

In the embodiment illustrated in Fig. 5, the quantity W or angular velocity of the craft is determined by a rate-of-turn gyro indicated generally at 65. This gyro has been somewhat schematically illustrated, and a full description thereof is not believed necessary since its principles of operation are well known. Briefly, however, the gimbal ring 66 thereof supporting the gyro rotor is constrained to a neutral position by the spring 67 and will precess in one direction or the other about the axis of the gimbal ring to an amount dependent upon the angular velocity of the craft on which it is mounted. Adjustment of the spring tension may be effected by the control knob 68. On one trunnion 69 of the gimbal ring is mounted the rotor winding 70 of a signal transformer 71. The stator winding 72 of this transformer is connected across a suitable source of alternating current 73 and the rotor winding 70 supplies a signal voltage output which in magnitude and phase sense is a measure of the angular displacement of the gimbal ring of the rate-of-turn gyro and its direction of displacement. Therefore, the voltage output from rotor winding 70 is an electrical measure of W or the angular velocity of the aircraft.

For measuring air speed, any suitable type of air speed meter as indicated generally at 75 may be employed, and on the output shaft 76 thereof is mounted the rotor winding 77 of a second signal transformer 78. Stator winding 79 of this transformer is also preferably connected across the source of alternating current 73 and the rotor winding 77 thereof will supply a voltage which varies in accordance with angular rotations of shaft 76, and, therefore, is a measure of air speed.

The two signal voltage components supplied from the transformers 71 and 78 are multiplied together by means of an electric motor such as the two phase induction motor indicated generally at 81, the rotor winding 70 of transformer 71 being connected to the field winding 82 of motor 81 and the rotor winding 77 of transformer 78 being connected to the field winding 83 of said motor. The phase relation of the signal voltages may be adjusted by means of suitable condensers (not shown) in the circuits to the field windings of the motor. The rotor 84 of motor 81 is constrained by the spring 85 which serves to introduce the tangent function into the computation performed by this mechanism. In other words, the rotor 84 of motor 81 will rotate from its spring constrained position in one direction or the other, depending upon the product of the magnitudes of the voltages supplied to the field windings thereof and their phase senses, or, the angular displacement of rotor 84 will be proportional to the product of W, the angular velocity of the craft, and V, the air speed. The term $$\frac{1}{g}$$

can be introduced at either signal transformer, for example, or in the associated mechanisms, such as the rate gyro or air speed meter. In other words, the angular displacement of the rotor 84 will be a measure of the bank angle resulting from this computation.

The signal control transformer 22 or the signal control potentiometer 56, hereinabove described, is operated by the output of motor 81. In other words, the contacts of the potentiometer or the rotor of transformer 22, as illustrated, are connected to be driven by the output of motor 81 or may be mounted on the rotor shaft 86 as shown. The operation of the device shown in Fig. 5 is the same as that shown in Fig. 1, the only difference residing in the fact that the signal mixer or control transformer of Fig. 5 is operated in accordance with a computed bank angle, rather than by means directly measuring the actual bank angle of the craft.

A D. C. computing circuit may of course be employed in which the rate-of-turn gyro and the air speed meter operate potentiometers which control the magnitude of two voltage components supplied to a crossed coil, spring restrained dynamometer. The dynamometer multiplies the W and V terms and also introduces the desired tangent function.

The mixer or signal transformer may also be actuated by means of an accelerometer as shown in Fig. 6. In Fig. 6, I have indicated the signal mixer or transformer at 22 and the rotor thereof is actuated by a lever arm 87 which, in turn, is operated by a simple form of accelerometer. The transformer 22 in Fig. 6, has a structure and function corresponding to the transformer 22 illustrated in Figs. 1, 2, 3 and 5, and in each case the transformer is identified by the same reference numeral to indicate that this relationship exists. The accelerometer, as schematically shown, comprises as its essential elements a mass 88 which is supported to move in a guide member 89. A spring 90 is connected between mass 88 and a support 91. Motion of the mass may be transmitted to the lever arm 87 by means of a pin 92 which may pass through a slot 93 in the guide member 89, the pin 92 engaging the slot formed by the bifurcated end portion 94 of lever arm 87. Guide 89 is normally arranged to extend vertically when the craft is in level flying position and is fixed to rotate with the craft about its bank axis. In the full line position thereof, it is assumed that the craft is in level flight and the only force acting on the mass 88 is the acceleration due to gravity. With this position of the mass, the parts of the signal transformer 22 will occupy the positions thereof illustrated in Figs. 1, 2 and 3. However, when the craft executes a turn and banks, the position of the mass relative to guide 89 and transformer 22 will change to that, for example, illustrated in dot-dash lines at 88'. The length of the lever arm 87 and the stiffness of the spring may be so correlated as to introduce the desired tangent function whereby changes in position of the mass 88 due to the bank of the craft will produce relative angular movement of the stator and rotor of the transformer through an angle which is a measure of the bank angle. The accelerometer arrangement will provide a good approximation of bank angle throughout a range of 0° to about 60° or so, but for values above this range, its accuracy progressively decreases.

In the foregoing described embodiments of my invention, I have illustrated devices which will provide quite accurate control of the rudder and elevator signals supplied to both the rudder and elevator amplifiers, the proportions of these signals supplied to the two amplifiers being dependent either directly upon the actual bank angle of the craft or upon a computed bank angle. If such accuracy is not deemed necessary in some cases, the cross control of the signals could be effected in accordance with a measurement of W or the angular velocity of the craft, alone, or in accordance with $$\frac{WV}{g}$$

disregarding the tangent function. If W alone were measured, this would afford correct results for some one air speed. It will be noted that the gyro vertical of Fig. 1, the rate gyro of Fig. 5, and also the accelerometer of Fig. 6, all constitute inertia-exhibiting devices. In other words, the gyros tend to retain their respective positions in space, thereby affording means by which the bank angle of the craft or its rate of turn in azimuth may be ascertained. Similarly, the mass 88 of the accelerometer of Fig. 6, because it exhibits inertia and is responsive to acceleration forces, functions to operate the rotor of transformer 22 as hereinabove described.

It will be noted that my present invention provides a much more accurate and stable control of an aircraft than automatic pilots of the conventional types, wherein the rudder and elevator signals control, respectively, only the rudder and the elevators. For example, in an automatic pilot of the latter type, and assuming that a steep banked left turn is executed, the aircraft lagging the directional gyro reference to give a "left" rudder signal, the controlled moment applied by the rudder will accelerate the ship toward a nosedown position. This latter movement of rotation, which is about the yaw axis of the ship, will have a component in pitch which will produce an "up" elevator signal. The control moment applied by the elevator will increase the rate-of-turn. Similarly, a pitch signal will produce a change in the rate-of-turn which initiates a rudder signal to change the pitch. In other words, the rudder and elevator servo systems will operate partially in cascade to effect an increase in the rate-of-turn or change of altitude, and the time lag in providing a correct control is greater than the lag in either servo system in controlling the craft about either axis taken alone.

However, where a system of the present invention is used, assuming the above conditions wherein the craft is steeply banked to execute a left turn, the cross control of the signals would apply most of the left rudder signal to the elevator amplifier to provide an "up" elevator operation of the elevator servo, thereby increasing the rate-of-turn. Similarly, a large component of any pitch signal would be utilized directly to control the rudder and thereby produce a change in pitch.

It will of course be understood that the present invention may be embodied in control systems other than automatic pilots and in other fields than aircraft. Further, while I have described the application of my invention to rudder and elevator controls, it may be used in cross controlling other control surfaces.

While I have described my invention in its preferred embodiments, it is to be understood that the words which I have used are words of description, rather than of limitation, and that changes within the purview of the appended claims may be made without departing from the true scope and spirit of my invention in its broader aspects.

What is claimed is:

1. In a control system for a body movable about two axes in space, a pair of control-responsive means for respectively controlling the movement of said body about two axes of said body corresponding respectively to said two space axes, control means for normally controlling but one of said pair of control-responsive means when corresponding space and body axes lie in substantial correspondence, means for transferring said control to the other of said pair of control responsive means, and means operable in accordance with movements of each of the axes of said body out of substantial correspondence with the corresponding one of said space axes and toward the other of said space axes for operating said control-transferring means.

2. In a control system for a body movable about two axes in space, a pair of control-responsive means for respectively controlling the movement of said body about two axes of said body respectively corresponding in direction to said two space axes, a pair of control means for respectively controlling said pair of control responsive means, means for transferring the control of each of the control means from one to the other of said pair of control-responsive means, and means operable in accordance with movements of the axes of said body out of correspondence with the corresponding one of said space axes and toward the other of said space axes for operating said control-transferring means.

3. In a control system for a body movable about two mutually perpendicular axes in space, a pair of control-responsive means for respectively controlling the movement of said body about two mutually perpendicular axes of said body normally substantially paralleling, respectively, said two space axes, a pair of control means for respectively controlling said pair of control-responsive means, the control of said control means being exercised substantially over but one of the control-responsive means, respectively, when the axes of said body lie in substantial parallelism with respective space axes, means for transferring the control of each of the control means from one to the other of said pair of control-responsive means, and means operable in accordance with movements of the axes of said body out of correspondence with one of said space axes and toward the other of said space axes for operating said control-transferring means.

4. In an automatic pilot for dirigible craft having a control surface for controlling movement of said craft about an axis thereof, means for actuating said control surface, a pair of means including a first means responsive to turning movements of said craft about one axis and a second means responsive to turning movements of said craft about a second axis, said pair of means being connected to control said actuating means, and means for varying the relative proportionality of the control exercised by said pair of means over said actuating means.

5. In a control system for dirigible craft having a control surface for controlling movement of said craft about an axis thereof, signal-responsive means for actuating said control surface, a pair of signal-producing means responsive respectively to movement of said craft about said axis and a second axis of said craft, and means including operating means therefor automatically operable in accordance with movements of the craft about an axis normal to said two axes for supplying signals from said pair of means to said actuating means in amounts dependent upon the position of the craft about said axis normal to said two axes.

6. In a control system for dirigible craft having a first control surface for controlling movement of said craft about a first axis and a second control surface for controlling movement about a second axis, a first and second signal-responsive means for actuating said control surfaces, respectively, a first and second signal-producing means connected to control said signal responsive means respectively, and means for supplying each of said signals to both of said signal-responsive means in amounts dependent upon the displacement of said craft about a third axis.

7. In a control system for a body movable about two relatively angularly disposed axes in space, a first signal responsive means for controlling movement of said body about a first of its axes and a second signal-responsive means for controlling movement about a second of its axes angularly disposed to the other thereof, said body being movable in a direction interchangeably to align its axes with said space axes, a first and second signal-producing means connected to control said first and second control means, and means for supplying each of said signals to both of said control means in amounts dependent upon the relation of said craft axes to said space axes.

8. In a control system for dirigible craft, a first means for controlling movement of said craft about a first axis, a second means for controlling movement about a second axis, a first pick-off for producing a signal dependent on movement of said craft about said first axis, a second pick-off for producing a signal dependent on movement of said craft about said second axis, said pick-offs being respectively connected in controlling relation to said control means, and means for supplying each of said signals to both of said control means and varying the magnitude of the signals so supplied in accordance with movement of said craft about a third axis.

9. In a control system for dirigible craft having a pair of control surfaces for controlling movement of said craft about a pair of axes thereof, respectively, a pair of signal-responsive means for respectively actuating said control surfaces, signal-producing means for controlling said signal-responsive means, and means for progressively reducing the signal applied to one of said signal-responsive means while increasing the signal applied to the other thereof as said craft rotates about an axis normal to said two axes.

10. In a control system for dirigible craft, a first control surface, actuating means therefor and control means for said actuating means whereby movement of said craft about one axis thereof may be controlled, a second control surface, actuating means therefor and control means for said latter actuating means whereby movement of said craft about a second axis may be controlled, means for at least in part transferring the output of one of said control means from one of said actuating means to the other, and means operable in accordance with the displacement of said craft about an axis normal to said two axes for controlling said control-transferring means.

11. In an automatic pilot for dirigible craft comprising a first control surface for controlling movement of said craft about a first axis thereof, a second control surface for controlling movement of the craft about a second axis thereof, first and second signal-responsive means for actuating said control surfaces, a signal-producing means, and means including operating means therefor automatically operable in accordance with movements of the craft about a third axis for variably supplying the signal to both of said signal-responsive means in magnitudes dependent upon the position of said craft about said third axis.

12. In an automatic pilot for dirigible craft comprising a first control surface for controlling movement of said craft about a first axis thereof, a second control surface for controlling movement of the craft about a second axis thereof, first and second signal-responsive means for actuating said control surfaces, a signal-producing means, means for supplying the signal in varying magnitudes to both of said signal-responsive means, and means including an element so positioned and having sufficient inertia as to operate in response to the movement of said craft about a third axis to control said last mentioned means in accordance with displacement of said craft about said third axis.

13. In an automatic pilot for dirigible craft comprising a first control surface for controlling movement of said craft about a first axis thereof, a second control surface for controlling movement of the craft about a second axis thereof, first and second signal-responsive means for actuating said control surfaces, a signal-producing means, means for supply the signal in varying magnitudes to both of said signal-responsive means, a gyroscope and means actuated thereby for controlling the operation of said last mentioned means.

14. In an automatic pilot for dirigible craft comprising a first control surface for controlling movement of said craft about a first axis thereof, a second control surface for controlling movement of the craft about a second axis thereof, first and second signal-responsive means for actuating said control surfaces, signal voltage producing means, inductance means for supplying the signal voltage in varying magnitudes to both of said signal-responsive means, and means responsive to movement of said craft about a third axis for controlling the operation of said inductance means.

15. In an automatic pilot for dirigible craft comprising a first control surface for controlling movement of said craft about a first axis thereof, a second control surface for controlling movement of the craft about a second axis thereof, first and second signal-responsive means for actuating said control surfaces, signal voltage-producing means, a potentiometer including a resistance element and contacts movable thereover, said potentiometer being connected to said voltage-producing means and to said signal-responsive means, and means responsive to movement of said craft about a third axis for effecting relative movement between said resistance element and contacts.

16. In an automatic pilot for dirigible craft comprising a first control surface for controlling movement of said craft about a first axis thereof, a second control surface for controlling movement of the craft about a second axis thereof, first and second signal-responsive means for actuating said control surfaces, a signal-producing means, and means for supplying the signal to both of said signal-responsive means and for varying the proportion of said signal so supplied to each thereof as a sine and cosine function, respectively, of the angular movement of said craft about an axis normal to said first and second axes.

17. In an automatic pilot for dirigible craft comprising a first control surface for controlling movement of said craft about a first axis thereof, a second control surface for controlling movement of the craft about a second axis thereof, first and second signal-responsive means for actuating said control surfaces, respectively, first and second signal-producing means, means for supplying both of the signals to both of said signal-responsive means, and means for varying the proportion of the signals supplied to said signal-responsive means as a sine and cosine function, respectively, of the angular movement of said craft about an axis normal to said first and second axes.

18. In an automatic pilot for dirigible craft comprising a rudder and elevator, respective signal-responsive means for actuating said rudder and elevator, a rudder signal-producing means and an elevator signal-producing means, means for supplying both of the signals so produced to both of said signal-responsive means, and means actuated by means responsive to tilt of said craft in bank for controlling the proportion of both signals supplied to each of said signal-responsive means.

19. In an automatic pilot for dirigible craft comprising a rudder and elevator, respective signal-responsive means for actuating said rudder and elevator, a gyro-vertical, a first signal pick-off on the pitch axis of said gyro, a directional gyro, a second signal pick-off on the azimuth axis of said directional gyro, and means for supplying both signals to both of said signal-responsive means, said last mentioned means including a rotor and stator, one thereof being operatively connected with said pick-offs and the other being connected with each of said signal-responsive means, and one thereof being fixed to move with said craft in bank and the other being stabilized by said gyro-vertical about its bank axis.

20. An automatic pilot of the character recited in claim 19 in which the means for supplying the signals to both of the signal-responsive means comprises inductively coupled stator and rotor coils.

21. An automatic pilot of the character recited in claim 19 in which the means for supplying the signals to both of the signal-responsive means comprises a potentiometer having a resistance element and a plurality of contactors movable therealong.

22. In an automatic pilot for dirigible craft comprising a rudder and elevator, respective signal-responsive means for actuating said rudder and elevator, a gyro-vertical, a first signal pick-off on the pitch axis of said gyro, a directional gyro, a second signal pick-off on the azimuth axis of said directional gyro, and means for supplying both signals to both of said signal-responsive means, said last mentioned means comprising a rotor and stator, each thereof comprising a pair of coils having their axes in mutually perpendicular relation, the coils of said one pair being operatively connected respectively with said pick-offs and the coils of said other pair being connected respectively with said signal-responsive means, and said stator being fixed to move with said craft in bank and the rotor being stabilized by said gyro-vertical about its bank axis.

23. In an automatic pilot for dirigible craft comprising a first control surface for controlling movement of said craft about a first axis thereof, a second control surface for controlling movement of the craft about a second axis thereof, first and second signal-responsive means for actuating said control surfaces, signal-voltage producing means, and means for supplying said signal to both of said signal-responsive means, said last mentioned means comprising a rotor and stator including inductively coupled rotor and stator coils, one thereof comprising a pair of coils having their axes in mutually perpendicular relation and connected respectively with said signal-responsive means and the coil of the other being connected to said signal-voltage producing means, and means for effecting relative angular rotation between said stator and rotor in proportion to angular movements of said craft about an axis normal to said two axes.

24. In an automatic pilot for dirigible craft comprising a rudder and elevator, respective signal-responsive means for actuating each thereof, a gyro-vertical, a signal pick-off on the pitch axis of said gyro, a directional gyro, a signal transformer on the azimuth axis of said directional gyro, signal-producing means electrically connected with said transformer, signal-transferring means including a stator and rotor, one thereof being connected with said pick-off and transformer and the other thereof with said signal-responsive means, the stator being fixed to move with said craft in bank and the rotor being connected with said gyro-vertical for stabilization thereby about the bank axis of said craft, whereby upon bank of said craft in turning in response to a signal from said signal-producing means said signal will be supplied in part to both of said signal-responsive means.

25. In a control system for a body movable about two axes in space, a first control-responsive means for controlling movement of said body about a first of said space axes, a second control-responsive means for controlling movement of said body about a second space axis, a first control means responsive to movement of said body about said first space axis for controlling said first control-responsive means, a second control means responsive to movement of said body about the second space axis for controlling said second control-responsive means, means operable progressively to transfer the control of each of the control means from one to the other of said control-responsive means, and means responsive to movements of the body about an axis normal to said two space axes for operating said control-transferring means.

26. In a control system for dirigible craft, a first control surface, actuating means therefor and control means for said actuating means whereby movement of said craft about one axis thereof may be controlled, a second control surface, actuating means therefor and control means for said latter actuating means whereby movement of said craft about a second axis may be controlled, means for supplying the output of one of said control means in variable amounts to both of said actuating means, and means responsive to turning movements of the craft about an axis normal to said two axes for controlling said output-supplying means.

27. In an automatic pilot for dirigible craft comprising a rudder and elevator, actuating means for each thereof, means for respectively controlling said actuating means, means defining a positional reference about the fore and aft axis of the craft, and pick-off means associated with said reference-defining means for modifying the control exercised by said control means over the operation of said rudder and elevator-actuating means whereby the displacement of the rudder and elevator in response to said control means is dependent upon the angular displacement of the craft about its fore and aft axis.

28. A control system of the character recited in claim 5 in which the operating means for the signal-supplying means includes a gyroscope.

29. In an automatic pilot for aircraft having rudder and elevator control surfaces, a directional gyro, a horizon gyro, means for controlling said rudder control surface in accordance with displacement of said aircraft relative to said directional gyro, means for controlling said elevator control surface in accordance with the displacement of said aircraft relative to said horizon gyro, and means for transferring the control of said rudder control surface from said directional gyro to said horizon gyro and for transferring the control of said elevator control surface from said horizon gyro to said directional gyro when said aircraft is banked, the degree of transfer of controls varying in accordance with the inclination of the lateral axis of said aircraft relative to a horizontal plane.

RICHARD S. BRANNIN.

REFERENCES CITED

The following references are of record in the file of this patent:

UNITED STATES PATENTS

| Number | Name | Date |
|---|---|---|
| 1,869,840 | Boykow | Aug. 2, 1932 |
| 2,162,862 | Protzen | June 20, 1939 |
| 2,190,390 | Thiry | Feb. 13, 1940 |
| 2,190,391 | Thiry | Feb. 13, 1940 |
| 2,196,385 | De Florez et al. | Apr. 9, 1940 |
| 2,221,748 | Alkan | Nov. 19, 1940 |
| 2,293,889 | De Florez | Aug. 25, 1942 |
| 2,351,977 | Kronenberger | June 20, 1944 |
| 2,371,388 | Glenny | Mar. 13, 1945 |
| 2,373,315 | Kenyon | Apr. 10, 1945 |